Patented Dec. 27, 1949

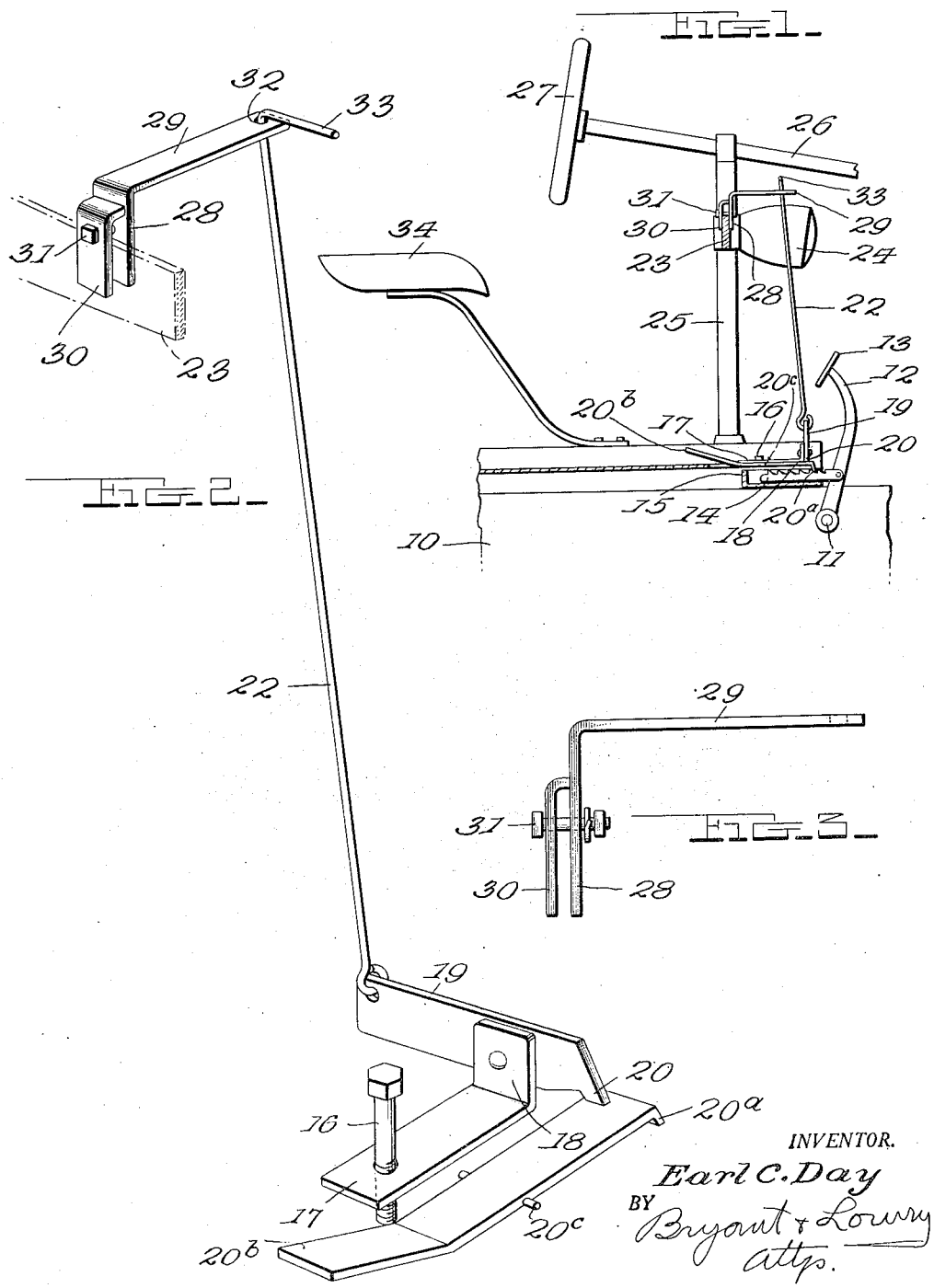

2,492,466

UNITED STATES PATENT OFFICE 2,492,466

BRAKE SETTING MECHANISM

Earl C. Day, Gilmore City, Iowa

Application April 5, 1948, Serial No. 19,139

2 Claims. (Cl. 74—541)

This invention relates to tractor brake locks such as are used to hold the brakes of automotive tractors in brake set position.

One important object of the invention is to provide a novel means for manual operation of a brake setting mechanism.

A further important object of the invention is the provision of a manually operable brake setting mechanism for brakes of the aforesaid character which is readily accessible to the driver of a tractor without moving from his ordinary position on the seat of such tractor.

Another object of the invention is the provision of a brake setting mechanism for the brake of a tractor or the like wherein the brake setting mechanism is manually operated.

With the above and other objects in view, as will be presently apparent, the invention consists in general of certain novel details of construction and combination of parts hereinafter fully described, illustrated in the accompanying drawings, and particularly claimed.

In the accompanying drawings, like characters of reference indicate like parts in the several views, and Figure 1 is a side elevation, partly in section, showing a portion of a tractor with the present invention applied thereto;

Figure 2 is an enlarged perspective view of certain elements of this invention; and Figure 3 is a detail side view of a certain bracket used herein.

In the present showing of the invention, there is disclosed a portion 10 of a tractor, this portion being part of the housing of the change gear means of such a tractor. In this housing is journaled a shaft 11 which is in communication with the brake mechanism by means of which, upon rotation of the shaft in one direction, brakes may be applied to the wheels of the tractor. On the shaft 11, as is usual, is fixed a lever 12 designed to apply the brakes upon the driver of the tractor pushing forwardly with the foot upon the pedal 13 carried by the end of the lever 12. On this lever is pivoted a rack-bar 14 which reciprocates in a casing 15 as the lever 12 is oscillated during movement thereof to apply and release the brakes of the vehicle. Above the casing 15 there is secured to the gear housing 10, by a bolt 16, an angle bracket 17 which has its angle end 18 directed upwardly. To the angled end 18 of the bracket, there is pivoted a latch lever 19 having a nose or end 20 projecting downwardly from one end thereof.

A plate-like dog 20b is pivotally supported by means of laterally extending pins 20c directly above the housing 15 for the rack-bar 14 and as the housing 15 is open at its upper side the nose 20a at the end of the dog 20b is positioned for engagement with the teeth of the rack-bar.

To the opposite end of the latch lever 19 there is pivotally connected the lower end of a rod 22 which extends upwardly therefrom. At 23 is shown the bar for supporting headlights such as at 24. The bar 23 is carried by a post 25 which also supports the shaft 26 of the steering gear of the tractor, this shaft carrying the steering wheel 27. On one side of the bar 23 is located the vertical arm 28 of a bracket having a horizontal arm 29 extending forwardly of the bar 23. On the opposite side of the bar 23 there is provided a clip 30 gripping against the bar 23 by means of a bolt 31. In the arm 29 is an opening 32 through which extends the upper end of the rod 22 that is laterally bent to provide a handle 33. It is to be noted that this handle is within convenient reach of an operator seated on the usual tractor seat 34.

In addition to the advantages above pointed out, the assemblage is so formed and arranged as to greatly simplify the structure and operation of devices used for this particular purpose, not only through providing for hand control for actuating the device, with the point of control in the vicinity of the steering assembly, as heretofore pointed out, but also through the fact that the assemblage is so formed as to permit efficient operation without the necessity of utilizing spring elements as a part of the structure. The dog 20b has its pivots so positioned as to provide a normally unbalanced condition to the dog and which tends to retain its nose in inactive position. Lever 19 has its pivot so arranged as to provide a similar action with respect to nose 20 of the lever. Hence, the parts are normally retained active through the differences in weight effect present at the opposite ends of these members, the weight factor of lever 19 being supplemented by the weight of rod 22. Furthermore, while these weight factors are present when it is desired to make the dog active, the resistance to the needed movements of the parts is so low that the handle 33 can be raised by the use of a very small pressure, a finger being sufficient, and yet the weights are sufficient to rapidly move the movable parts to inactive positions, when these parts are released.

Handle 33 limits the extent of downward movement of rod 22 and thus limits the extent of upward movement of nose 20, the latter in turn limiting the extent of upward movement of the nose end of dog 20b. However, the relations between these parts do not prevent individual movements of the lever and dog. For instance, assume the brake has been advanced and it is desired to lock it in such position. Handle 33 is raised, thus moving nose 20a into the path of travel of the teeth of rack 14. The brake is eased to bring a tooth into engagement with nose 20a, whereupon the handle is released and falls because of the weight factor, thus raising nose 20 out of contact with nose zone 20a leaving the latter nose in engagement with the rack where it remains, until the brake lever is advanced, when the weight factor of dog 20b causes its nose 20a to rise to contact nose 20, the inactive position of nose 20a leaving the rack completely free to move.

The assemblage, designed particularly for service in connection with tractors, requires supporting means for the upper end zone of rod 22, since the latter is to be located in the vicinity of the steering wheel, and utilizes the support to provide a limit to the movement of the rod. This support is provided by the bracket shown in Fig. 3, the latter being mounted on an arm which supports the lamp and is positioned in the vicinity of the steering wheel. Since the arm lengths of operators of the tractor may vary, the support is made readily adjustable lengthwise of such lamp arm or support, thus assuring that the handle will be located in the most convenient position for raising, the articulation of the lower end connection of the rod with lever 19 permitting such adjustment without disturbing the position of the lever or its operation.

In operation, when it is desired to set the brakes, the operator or driver presses with his foot on the pedal 13 in the usual manner. He then grasps the conveniently placed handle 33 without having to bend over, and raises the rod 22. This effects tilting of the latch lever 19 so that the nose 20 thereof depresses the forward end of the dog 20b and causes the nose 20a of the dog to engage the appropriate tooth of the rack-bar 14. When it is desired to release the brake on the tractor, it is only necessary to exert slight pressure on the brake pedal 13, whereupon the dog 20b which is pivoted off center will raise at its forward end to permit the nose 20a to become disengaged from the rack-bar 14. It will be understood that the locking of the brake is effected by a slight upward movement of the handle 33 as before stated, and to release the brake, it is only necessary to exert slight pressure on the brake pedal.

What is claimed as new, is:

1. In brake-locking assemblages for tractors and the like, wherein the brake pedal carries a toothed rack movable therewith horizontally, and wherein a pivoted latching member is positioned to permit cooperation with the rack throughout the range of rack movement with the latching member normally inactive relative to the rack, an assemblage of such type characterized in that the latching member is pivotally mounted with the pivot axis positioned at such intermediate point in the member length as to provide a normally unbalanced condition of the member with the member nose out of the path of movement of the rack teeth, and means manually operative at will for rocking the latching member to place its nose into such rack-teeth path, said means comprising a lever having its direction of length extending at approximately right angles to the direction of length of the latching member, said lever being pivoted in an intermediate zone of its length to provide a long and a short arm with the end zone of the shorter arm having a depending nose, the pivot of the lever being positioned to locate the lever nose in overlying relation to the latching member intermediate the pivot axis and the nose of the latching member, a rod having its lower end articulated with the longer arm of the lever and extending upwardly to the vicinity of the steering zone of the tractor, a bracket mounted in such zone and having an opening therein for the passage of said rod, the upper end of the rod having a laterally-extending arm projecting beyond the bracket, the weight of the rod and the longer arm of the lever normally causing the lateral handle arm to rest upon the bracket and to locate the lever nose in inactive raised position, whereby raising of the hnadle arm will cause lever movement to rock the latching member nose into the path of movement of the rack teeth by downward movement of the lever nose to thereby permit tooth and latching member nose engagement, release of the handle arm causing the weight of rod and lever long arm to return the handle arm and the lever to normal inactive position with the latching nose remaining in engagement with a rack tooth, pedal movement in the direction of brake advance releasing the latter engagement by the unbalancing weight of the latching member and thereby moving the latter to normal inactive position.

2. An assemblage as in claim 1 including a lamp-supporting element for the tractor and to which said bracket is attached, the bracket including clamping means operable for ready positioning of the bracket on the element with the bracket adjustable lengthwise of the element.

EARL C. DAY.

REFERENCES CITED

The following references are of record in the file of this patent:

UNITED STATES PATENTS

| Number | Name | Date |
| --- | --- | --- |
| 1,218,028 | Williams | Mar. 6, 1917 |
| 1,550,633 | Peterson | Aug. 18, 1925 |
| 1,654,321 | Collins | Dec. 27, 1927 |
| 1,665,415 | Kehoe | Apr. 10, 1928 |
| 1,823,695 | Moorhouse | Sept. 15, 1931 |
| 1,927,209 | Gilmore | Sept. 19, 1933 |
| 2,108,666 | Hall | Feb. 15, 1938 |
| 2,119,638 | Klampferer | June 7, 1938 |
| 2,280,644 | Dickerson | Apr. 21, 1942 |
| 2,388,002 | Maiwald | Oct. 30, 1945 |
| 2,463,657 | Thompson | Mar. 8, 1949 |